United States Patent [19]
Hansel

[11] 3,956,439
[45] May 11, 1976

[54] METHOD AND APPARATUS FOR PLACING FOAMED PLUGS

[75] Inventor: William B. Hansel, Media, Pa.

[73] Assignee: Sun Oil Company of Pennsylvania, Philadelphia, Pa.

[22] Filed: Nov. 20, 1974

[21] Appl. No.: 525,332

[52] U.S. Cl. .............................. 264/46.6; 138/89; 166/295; 264/46.9
[51] Int. Cl.² .................. B29D 27/04; F16L 55/10
[58] Field of Search ............ 264/46.6, 46.9; 138/97, 138/89; 166/117.5, 117.6, 295

[56] References Cited
UNITED STATES PATENTS

| | | | |
|---|---|---|---|
| 3,084,719 | 4/1963 | Wallace et al. | 138/97 |
| 3,116,799 | 1/1964 | Lemons | 166/117.5 X |
| 3,294,121 | 12/1966 | Powell et al. | 138/97 |
| 3,310,615 | 3/1967 | Bender | 264/46.6 |
| 3,339,636 | 9/1967 | Frisby | 166/117.5 |
| 3,340,336 | 9/1967 | Bender | 138/97 X |
| 3,710,812 | 1/1973 | Wise | 138/97 X |
| R21,668 | 12/1940 | Carroll | 166/117.6 X |

OTHER PUBLICATIONS
St. Onge, H. S., "Updating Age Sewers Without Trenching", in Engineering and Contract Record, July, 1974, pp. 40, 41 and 44.

Primary Examiner—Philip Anderson
Attorney, Agent, or Firm—J. Edward Hess; Donald R. Johnson; Gary V. Pack

[57] ABSTRACT

For manipulating a length of non-rigid tubing into position around a swing joint (which includes a 90° fitting) in an underground pipe, a rigid guide tube (through which the non-rigid tubing may be passed) is utilized. The lower end of this guide tube is landed in the 90° fitting, and a wedging member or whipstock, manipulatable from the surface, is operated to hold this end of the guide tube solidly in position in the 90° fitting. After the guide tube is thus secured, the non-rigid tubing is passed down through the guide tube and around the 90° fitting into a laterally-extending pipe; then, a foam-forming composition is pumped through the non-rigid tubing into this latter pipe to form a foamed plug therein.

6 Claims, 3 Drawing Figures

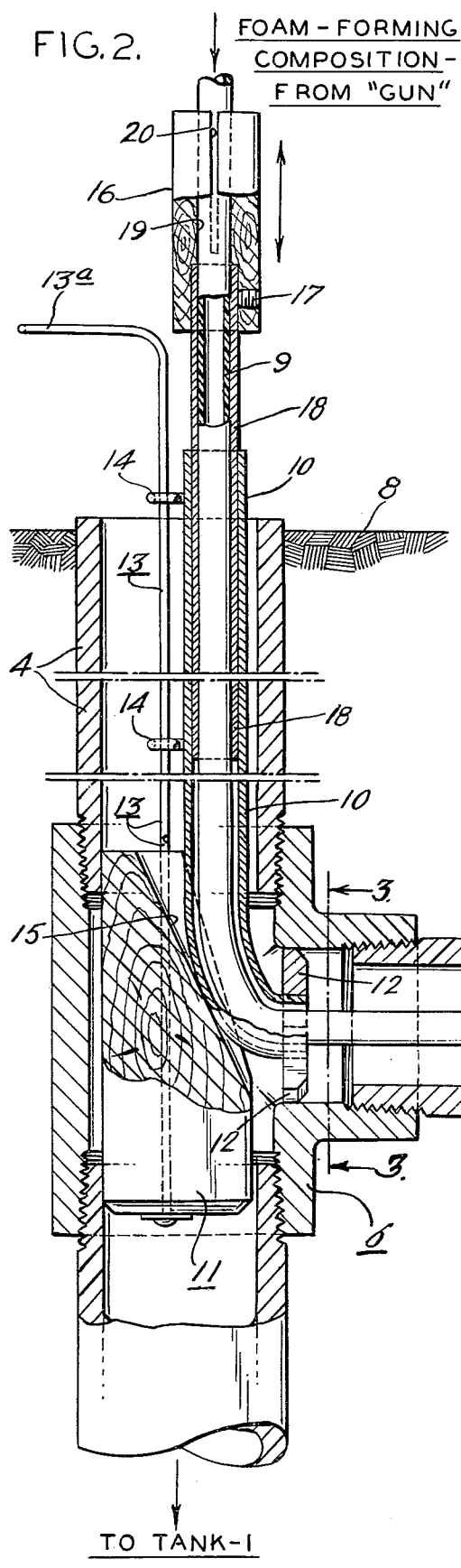
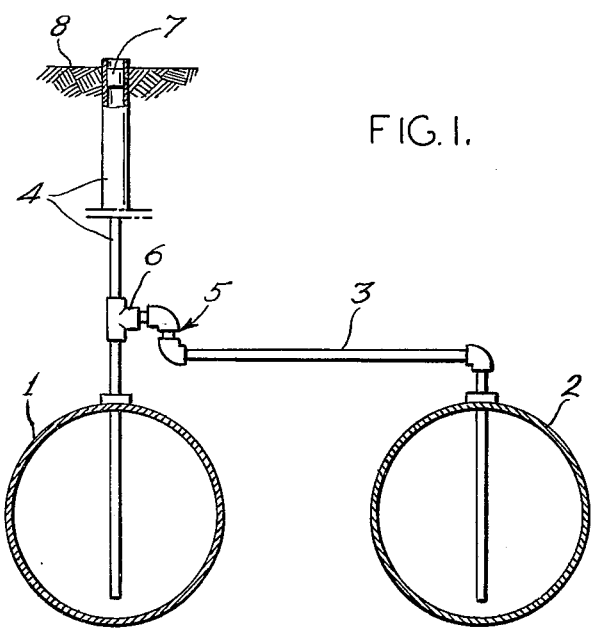
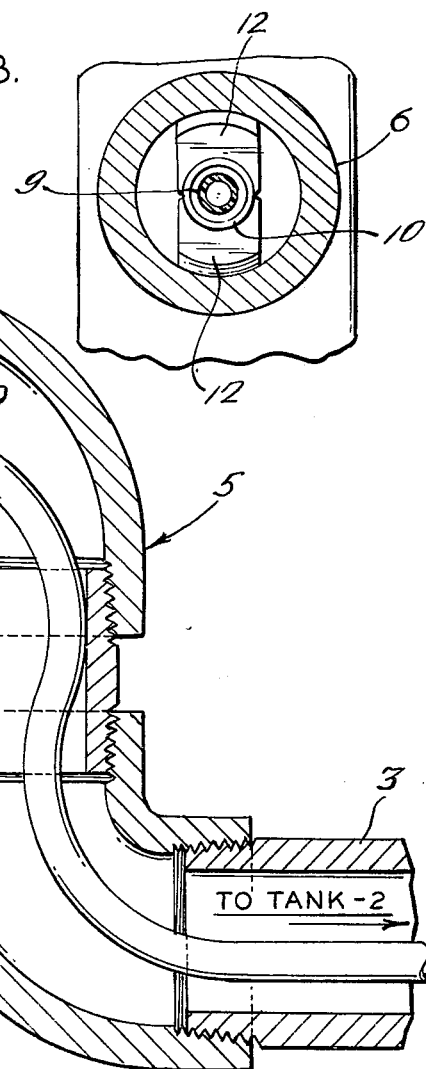
FIG. 1.
FIG. 2.
FIG. 3.

METHOD AND APPARATUS FOR PLACING FOAMED PLUGS

This invention relates to a method and apparatus for the modification of installed underground piping, such as that installed, e.g., at service stations, and more particularly to a method and apparatus for plugging such piping.

At the present time, there is being used rather extensively a multigrade fuel dispensing apparatus which can be adjusted to dispense, selectively, solely a "hi" gasoline (referring to a relatively high-octane liquid fuel component), solely a "lo" gasoline (referring to a relatively low-octane liquid fuel component), or a blend of these "hi" and "lo" gasoline components or constituents. An apparatus of this type is disclosed in U.S. Pat. No. 2,880,908.

Both of the aforementioned liquid fuel components contain, as an additive, a lead alkyl octane improver compound (known in the art as simply "lead"), although the proportions of "lead" ordinarily differ in the two different liquid fuel components.

It has been announced that some automobiles will be provided with exhaust emission control equipment (such as a catalytic converter or a catalytic muffler on the automobile exhaust) which requires a lead-free or substantially lead-free fuel exclusively, which is to say an unleaded or non-leaded fuel. To satisfy the demand for a lead-free or "clear" fuel in a way which prevents any contamination of the non-leaded fuel by lead, and which effectively forestalls the dispensing of leaded fuel into automobiles equipped as above described, as well as in a way which is economically attractive from a manufacturing standpoint, a "three-product" service station dispensing scheme could be utilized. In the present context, a so-called "three-product" scheme would involve, as the first and second products, the aforementioned "lo" and "hi" liquid fuel components, both containing lead, which would be dispensed at the service station through a blending-type dispensing apparatus such as disclosed in the aforementioned patent. The third product would involve a lead-free or non-leaded ("clear") motor fuel (gasoline), which would be dispensed at the service station through a conventional, single-product dispenser or dispensing apparatus. To carry this "three-product" scheme into effect, it would be necessary to convert all of the presently existing "two-product" service stations (meaning those stations which presently dispense "lo" and "hi" liquid fuel components through blending-type dispensing apparatus) to "three-product" stations.

Ordinarily, and quite typically, "two-product" stations utilizing blending-type dispensing apparatus as described are equipped with three underground tanks for gasoline storage, two of these being utilized for the "lo" fuel component and the third for the "hi" fuel component. For "two-product" operation, the fillpipes of the two "lo" gasoline tanks are manifolded together, and the suction pipes (for pumping gasoline out of the tanks) are connected together in a siphon arrangement. For conversion to a "three-product" scheme, it would be feasible to cut off the interconnections (the manifolded fillpipes, and the siphon-suction arrangement) between the two tanks used previously for "lo" gasoline storage, and then to use one of these two tanks for "lo" gasoline storage and the other for non-leaded or "clear" gasoline storage. Of course, it might be possible to dig down to the various underground lines involved and then install conventional (e.g., welded) pipe plugs at the appropriate locations, but this would be so costly as to be uneconomic and impractical.

An object of this invention is to provide a method and apparatus for effecting the plugging of an underground pipe from the surface, thus rendering excavation unnecessary.

Another object is to provide a method and apparatus for manipulating a length of non-rigid tubing into position around a 90° fitting in an underground pipe, from the surface.

A further object is to provide a novel method and apparatus for plugging underground pipes.

A still further object is to provide a method and apparatus for placing a plug in a laterally-extending underground pipe, from the surface.

Yet another object is to provide a novel tool for placing a plug in a laterally-extending underground pipe, from the surface.

A detailed description of the invention follows, taken in conjunction with the accompanying drawings, wherein:

FIG. 1 is a schematic illustration of a portion of a service station underground piping system; and FIG. 2 is a sectional view of apparatus according to this invention. FIG. 3 is a sectional view taken on line 3—3 of FIG. 2.

Refer now to FIG. 1. Two underground or subterranean gasoline storage tanks 1 and 2, illustrated as positioned in a spaced side-by-side configuration, may be manifolded together for pump suction purposes by means of a siphone line 3 which extends more or less laterally between the two tanks. Ordinarily, the main suction pipe 4 extends vertically upwardly from one of the tanks 1 to the surface, and this pipe 4 is coupled to the lateral siphon line 3 by means of a so-called swing joint, denoted generally by numeral 5. The swing joint 5 comprises an arrangement of nipples and ells connected in a more or less conventional manner to permit tanks 1 and 2 to shift relatively to each other (due to temperature variations, etc.) without damage, even though they are connected together by means of pipes. The initial element of the swing joint is a tee fitting 6 one arm of which is coupled to tank 1, another arm of which is coupled to the main suction pipe 4, and the third arm of which is coupled through the swing joint 5 to the laterally-extending siphon line 3. Ordinarily, a check valve 7 (which is removable from the surface, when work is to be done on the underground piping) is located in the main suction pipe 4, above the tee fitting 6.

The present invention comprises a method and apparatus for plugging the pipe 3 connecting the tanks 1 and 2, thereby to separate these underground tanks. According to the invention, this plugging is effected or carried out from the surface.

Refer now to FIG. 2. A portion of the main suction pipe 4 (which may have a diameter of 1½ inches, by way of example) is illustrated. This pipe extends in a substantially vertical direction, from tank 1 (not shown in FIG. 2) to and above the surface 8, and is customarily connected at its upper end to gasoline dispensing apparatus (not shown) located above the surface.

According to this invention, a high-density polyurethane (or similar polymeric material) plug (foamed plug) is formed in situ in the laterally-extending pipe 3, to plug this pipe. This plug is formed as a result of manipulations from the surface, no excavation being necessary. Such a plug is preferably made to have a length on the order of 18 inches or more, and, when fully set, completely fills and seals (or plugs) the interior of the pipe. It may be noted here that, although the polymeric material of the plug is somewhat porous, the pores are small and not interconnected, so that a leakproof plug is provided. As a result of the foaming action which takes place, the material of the plug expands to completely fill and seal the interior of the pipe.

In order to form a foamed plug in situ in the laterally-extending (substantially horizontally-extending) siphone line or pipe 3, it is necessary to convey the polymeric foam-forming composition to the location in such pipe where the plug is desired, and this calls for feeding a suitable length of tubing 9 (made of a somewhat stiff yet definitely non-rigid thermoplastic material) downwardly from the surface 8 through pipe 4, through the 90° turn of tee fitting 6, and through the remainder of the swing joint 5 to and into the pipe 3. Due to the flexible or yielding nature of this tubing, it is next to impossible, in practice, to place this tubing in the desired plugging position, from the surface, without utilizing some special (additional) tool or apparatus. The method and apparatus which is provided, according to this invention, for placing the tubing 9 in appropriate position (and thus also for placing the resulting foamed plug in the desired position) in pipe 3 will now be described.

A tool assembly, comprising a rigid guide tube 10 (e.g., copper tubing of ½ inch I.D.) which slidably carries, adjacent its lower end, a wooden member or block 11, is adapted to be lowered downwardly from the surface 8 through the main suction pipe 4. The I.D. of tube 10 is such as to allow the tubing 9 (which has an O.D. of ⅜ inch, for example) to slide freely therethrough. The guide tube 10 has a length sufficient to extend downwardly from the surface 8 to the tee fitting 6, and at its lower end, this tube is bent at an angle approaching 90° with respect to the main longitudinal axis of the tube, such that when the guide tube is in operative position, the lower end of the tube points toward the 90° arm of the tee 6. Positional lugs 12, which can serve as a foot for "landing" in the tee 6 when the composite tool 10, 11 is lowered downwardly from the surface, are welded to the lower (bent) end of tube 10.

The wedge block or member 11 is held in assembled relation with guide tube 10, and in slidable relation with respect to this tube, by means of two rigid metal rods 13 whose lower ends are secured to block 11. From block 11, rods 13 pass freely upwardly through two or more spaced wire loops 14 mounted on the outside of tube 10. To limit the displacement of member 11 with respect to tube 10 in a downward direction, as well as to provide a handle for manipulation of member 11, each rod 13 has at its upper end an integral handle portion 13a which is bent at substantially 90° to the length of the rod.

Block 11 has therein, in the face thereof adjacent tube 10, a tapered groove 15 of substantially semicircular cross-section, the radius of which matches the outer radius of guide tube 10. The taper of groove 15 is with respect to the vertical (axis of suction pipe 4), and the groove 15 is adapted to provide a wedging action for tube 10.

Assume that the check valve (previously referred to) has been first removed from the upper end of pipe 4, and that thereafter the composite tool 10, 11 has been lowered down pipe 4, and that the lug 12 at the lower end of tube 10 has been "landed" in the tee fitting 6. Now, when block 11 is pulled upwardly (by means of rods 13) with respect to tube 10, groove 15 engages the outer surface of tube 10, and as the member 11 continues to move upwardly block 11 wedges tube 10 upwardly and toward the right in FIG. 2, to bring lugs 12 into firm engagement with the fitting 6. Thus, member 11 provides a fixed whipstock for the guide tube 10, pointing its lower, bent end into the tee fitting 6, and holding its lower end securely in this fitting. This is the position illustrated in FIG. 2.

The rigid guide tube 10, which extends downwardly from the surface 8 (within the pipe 4) and which has its lower end secured in position (as previously described) by means of the wedge block (fixed whipstock) 11, serves as a guiding means for enabling the non-rigid (thermoplastic) tubing 9 (through which a polymeric foam-forming composition is caused to flow) to be pushed around the tee fitting 6 and the swing joint 5 into the desired location in the laterally-extending pipe 3.

In order to feed (i.e., push) the tubing 9 through the guide tube 10, a wood push block 16, which is securely fastened as by means of a set screw 17 to the upper end of a piece of copper tubing 18 about 18 to 24 inches long, is utilized. The inner copper tubing 18 telescopes within the outer tube 10, and the plastic tubing 9 passes down inside the inner tubing 18. At its upper end, the block 16, which has a longitudinal bore 19 for accommodating the tube 9 and also for accommodating, at its lower end, the tubing 18, is split (i.e., formed with a saw cut) at 20, such that the block can be manually squeezed together to firmly grip the plastic tubing 9. Thus, by alternately gripping, moving downwardly, and then releasing and moving upwardly, the push block 16, the plastic tubing 9 can be pushed downwardly through the guide tube 10 in approximate two-foot increments. The inner tubing 18 provides additional rigidity for the plastic tubing 9, as the plastic tubing 9 (surrounded by the inner tubing 18) moves downwardly through the guide tube 10 in incremental or stepwise fashion.

The fixed abutment or whipstocked lower end of the guide tube 10 enables the plastic tubing 9 to be guided into and pushed around the 90° turn at the tee fitting 6, with ease. The tubing 9 can easily be pushed through the remainder of the swing joint 5, to the desired location (i.e., the location where the plug is desired to be formed) in the laterally-extending pipe 3. Tubing 9 is shown in cross-section in FIG. 3 after having passed through guide tube 10 in tee fitting 6. Also shown is the manner in which lugs 12 position guide tube 10.

Once the lower (i.e., the underground) end of the tubing 9 has been pushed as above described into the desired location where the plug is to be formed, the upper (i.e., the surface) end of this tubing is connected to the outlet of a conventional, known type of urethane "gun," which then is activated to project (e.g., by means of compressed air) a polymeric foam-forming composition (a urethane formulation) through this tubing to the pipe 3. For example, the so-called conventional one-shot method may be employed for forming a foamed polyurethane plug in situ in the pipe 3, by the use of the "gun" and the delivery or flow tubing 9. This one-shot method reacts the polyol, isocyanate, catalysts and blowing agent components simultaneously. The mentioned components react to form in pipe 3 a flexible polyurethane foam (curing at room temperatures) which expands to fill (and hence to plug) the pipe 3. The foam-forming composition is fed through tubing 9 for a sufficient time to provide in pipe 3 a plug of the optimum (and appreciable) length.

Prior to the complete "setting" of the foamed plug which is being formed in pipe 3, the feed tubing 9 is retrieved by pulling the same back to the surface, through the guide tube 10 (the push block 16 with its attached tubing 18 having been previously removed). The tubing 9, being now filled with the foamed urethane, cannot be re-used; hence, it is discarded.

The composite tool 10, 11 is then retrieved by first pushing the member 11 downwardly with respect to tube 10 (by means of rods 13) to release the guide tube 10 from its locked position in fitting 6; then the tool 10, 11 is pulled upwardly to the surface as a unit.

The foamed plug which is formed in pipe 3, and is left therein, can be easily removed at a later time, when and if desired, by reaming out the same from the surface, with a suitable tool.

Although urethane foam has been described hereinabove as the material of the foamed plug, this has been done only by way of example. Various other polymeric materials (formed from multicomponent resin systems), which can be foamed in situ and which expand when foaming, can be utilized for the formed plug.

The invention claimed is:

1. A method of plugging an underground laterally-extending pipe connected to a tee fitting on a vertical pipe in which the laterally-extending pipe is accessible only through the top of said vertical pipe, comprising:
   a. passing a rigid guide tube, having an elbow on its lower end, into the vertical pipe and down to the point where the end of the elbow of the rigid guide tube is level with the tee fitting to which the laterally-extending pipe is connected;
   b. wedging the guide tube within the vertical pipe by pulling a wedge block from below the elbow, upwards between the elbow and the side of vertical pipe, so that the elbow on the guide tube is wedged in the tee fitting;
   c. feeding a non-rigid tubing through the guide tube, and into the laterally-extending pipe to the desired plug location; and
   d. feeding a foamable thermosetting resin reaction composition through said non-rigid tubing, thereby forming a foamed plug in situ in the laterally-extending pipe at the end of the non-rigid tubing.

2. Method according to claim 1, wherein the feeding of said non-rigid tubing is effected by means of a rigid tubing which closely surrounds the non-rigid tubing and which telescopes in the guide tube.

3. Method according to claim 1, wherein the foamable resin reaction composition is a foamable poly-urethane resin composition.

4. An apparatus for plugging an underground laterally-extending pipe connected to a tee fitting on a vertical pipe in which the laterally-extending pipe is accessible only through the top of said vertical pipe, and comprising:
   a. a rigid guide tube, having an elbow on its lower end;
   b. a wedge block slidably mounted to the rigid guide tube so that the whipstock is below the elbow on the rigid guide tube;
   c. means for manipulating the wedge block from above the top of the guide tube so that the whipstock can be slid into engagement between the elbow portion of the rigid guide tube and the vertical pipe to securely wedge the end of the elbow into the tee fitting; and
   d. non-rigid tubing extending through the guide tube, through the tee fitting in the vertical pipe, and through the laterally-extending pipe to the desired location for the plug.

5. The apparatus in accordance with claim 4, further including means for feeding a foamable thermosetting resin reaction composition through the non-rigid tubing, so that a foamed plug is formed in situ at the desired plug location.

6. Apparatus in accordance with claim 4, including also means for feeding said tubing telescopically through said guide tube.

* * * * *